United States Patent [19]

Steinman

[11] Patent Number: 4,842,004
[45] Date of Patent: Jun. 27, 1989

[54] QUICK-RELEASE ASSEMBLY FOR RUPTURE DISC INSERT TYPE HOLDER AND THE LIKE

[76] Inventor: Jack Steinman, 1501 Broadway, Hewlett, N.Y. 11557

[21] Appl. No.: 212,310

[22] Filed: Jun. 27, 1988

[51] Int. Cl.[4] .............................................. F16K 17/16
[52] U.S. Cl. ................................ 137/68.1; 137/454.2; 411/368; 411/428
[58] Field of Search ...................... 137/68.1, 315, 327, 137/328, 454.2; 411/368, 369, 370, 539, 428

[56] References Cited

U.S. PATENT DOCUMENTS

| | | | |
|---|---|---|---|
| 1,852,319 | 4/1932 | Leighton | 411/428 |
| 4,476,897 | 10/1984 | Morrill | 137/271 X |
| 4,550,743 | 11/1985 | McFarlane et al. | 137/68.1 |
| 4,580,691 | 4/1986 | Hansen | 137/68.1 X |
| 4,640,302 | 2/1987 | Impey | 137/315 X |

FOREIGN PATENT DOCUMENTS

| | | | |
|---|---|---|---|
| 2658225 | 6/1978 | Fed. Rep. of Germany | 137/68.1 |
| 3001108 | 7/1980 | Fed. Rep. of Germany | 137/884 |

Primary Examiner—A. Michael Chambers
Assistant Examiner—John C. Fox
Attorney, Agent, or Firm—Goodman & Teitelbaum

[57] ABSTRACT

A quick release assembly including a pair of flanges for receiving a rupture disc insert type holder and the like therebetween in a leak-tight seal, at least one of the flanges being secured to a pressure relief conduit of a pressure system. A minimum number of bolts, preferably a maximum of three Jack-type bolts, secure the two flanges together to provide a quick access to the rupture disc insert type holder disposed between the flanges for replacement or inspection of the rupture disc contained within the insert type holder, where the Jack-type bolts spread the two flanges apart. Stop pins are provided on at least one of the flanges to position the insert type holder between the two flanges. Preferably, one of the flanges is slotted, and the other flange has threaded openings therethrough to receive the Jack-type bolts to provide for a quick release spreading of the flanges apart, each Jack-type bolt being provided with a positioning collar thereon.

10 Claims, 4 Drawing Sheets

QUICK-RELEASE ASSEMBLY FOR RUPTURE DISC INSERT TYPE HOLDER AND THE LIKE

BACKGROUND OF THE INVENTION

The invention relates to rupture discs and, more particularly, to a quick-release assembly for a rupture disc insert type holder and the like, such as a graphite rupture disc, an orifice plate, and other piping accessories which fit inside bolted pipe flanges.

A rupture disc is well known in the art, being an engineered weak spot in a pressurized system which will rupture at a predetermined pressure and temperature. In modern processing equipment utilizing increasingly higher pressures and temperatures and faster speeds, there are three unpredictable conditions which can result in an unforeseen pressure rise causing an explosion with disastrous results, these conditions being power failure, air failure and human error. It is, therefore, required for all pressurized systems to be protected by a pressure relieving device to prevent the pressure from rising a predetermined percentage above the maximum workable working pressure of the system.

The above problem is easily handled by a rupture disc which is the ultimate in simplicity in that it has no moving parts, depending solely on the known strength of a thin metal diaphragm to function. The rupture disc has been proved to be more reliable than a relief valve, in that a relief valve has moving parts and precision machined surfaces which must interact perfectly, where the machining, assembly and setting of relief valves are all subject to human error. The complete rupture disc assembly, which includes the rupture disc and disc holder, is known as a safety head.

Rupture discs are normally disposed within holders, the holder being a two piece unit including a base flange disposed on the inlet side and a holddown flange disposed on the outlet side. The inner faces of these flanges grip the rupture disc therebetween in a sandwich arrangement to form a leak-tight seal. Insert type holders are disposed between companion pipe flanges which are bolted together. However, these pipe flanges require a great number of bolts secured around the insert type holder, which creates a time consuming and costly problem when the rupture disc within the insert type holder needs to be replaced or inspected. Accordingly, all of the bolts must be loosened, there usually being eight bolts or more, and at least half of the bolts must be removed. The pipe flanges usually must be forced apart by two men using pry bars before the insert type holder containing the rupture disc can be removed from between the pipe flanges.

U.S. Pat. Nos. 4,444,214 and 4,505,289 disclose rupture disc apparatus which eliminates the necessity of loosening or removing any bolts in order to insert or remove the rupture disc therefrom, as required above with the prior art companion pipe flanges. The rupture disc apparatus of these patents includes a fixed receptacle for receiving a cartridge having a rupture disc mounted therein. The fixed receptacle is mounted in a pressure relief vent to communicate on opposite sides thereof with the vent. The receptacle includes seating rings which are spring biased for seating on opposite sides of the cartridge. The rupture disc holding cartridge can only be inserted into the receptacle or removed therefrom when the vent pressure therein is substantially at atmospheric pressure. Accordingly, the rings are urged into locking position when the vent pressure is increased above atmospheric pressure, whereby the rings will not permit the cartridge to be removed from the receptacle until the vent pressure is again decreased to atmospheric pressure. It is understood, that the seating rings and their associated springs must be precisioned machine so that they interact perfectly during the movement of these parts, without being subject to human error.

SUMMARY OF THE INVENTION

It is, accordingly, an object of the present invention to provide a quick-release assembly for a rupture disc insert type holder and the like which avoids the aforementioned problems of the prior art.

Another object of the present invention is to provide a quick-release assembly as mentioned above to protect a pressurized system, equipment or vessel.

A further object of the present invention is to provide a quick-release assembly as mentioned above, which is reliable, has few moving parts, and is not subject to human error.

Still another object of the present invention is to provide a quick-release assembly as mentioned above which is simple, and can be easily manufactured without the requirement of precision machined surfaces.

A further object of the present invention is to provide a quick-release assembly as mentioned above which includes a pair of flanges for sandwiching a rupture disc insert type holder and the like therebetween to form a leak-tight seal.

Another object of the present invention is to provide a quick-release assembly as described above wherein a minimum number of bolts secure the above mentioned flanges together, and provide quick access to the rupture disc insert holder by forcing or spreading the flanges apart when replacing or inspecting the rupture disc disposed in the insert type holder, there preferably being only three Jack-type bolts.

And yet a further object of the present invention is to provide a quick-release assembly as mentioned above wherein stop means are provided on at least one of the flanges to position the rupture disc insert type holder and the like between the flanges.

Briefly, in accordance with the present invention, there is provided a quick-release assembly including a pair of flanges for receiving a rupture disc insert type holder and the like therebetween in a leak-tight seal, at least one of the flanges being secured to a pressure relief conduit, pipe or vent of a pressure system, equipment or vessel. A minimum number of bolts, such as preferably three Jack-type bolts secure the two flanges together, and provide quick access to the rupture disc insert holder between the flanges when it is desired to replace or inspect the rupture disc contained within the insert holder. The Jack-type bolts force or spread the two flanges apart when it is desired to remove the rupture disc insert type holder. Stop means are provided on at least one of the flanges to position the rupture disc insert type holder between the two flanges. Preferably, one of the flanges is slotted to quickly receive the head end portion of the Jack-type bolt which is provided with a positioning collar thereon, and the other flange has threaded openings therethrough to receive the threaded portion of the Jack-type bolt to threadingly secure the flanges together, and to also provide a quick release by forcing or spreading the flanges apart.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawings, like reference characters designate like parts.

DESCRIPTION OF THE PREFERRED EMBODIMENTS

Figure 1:
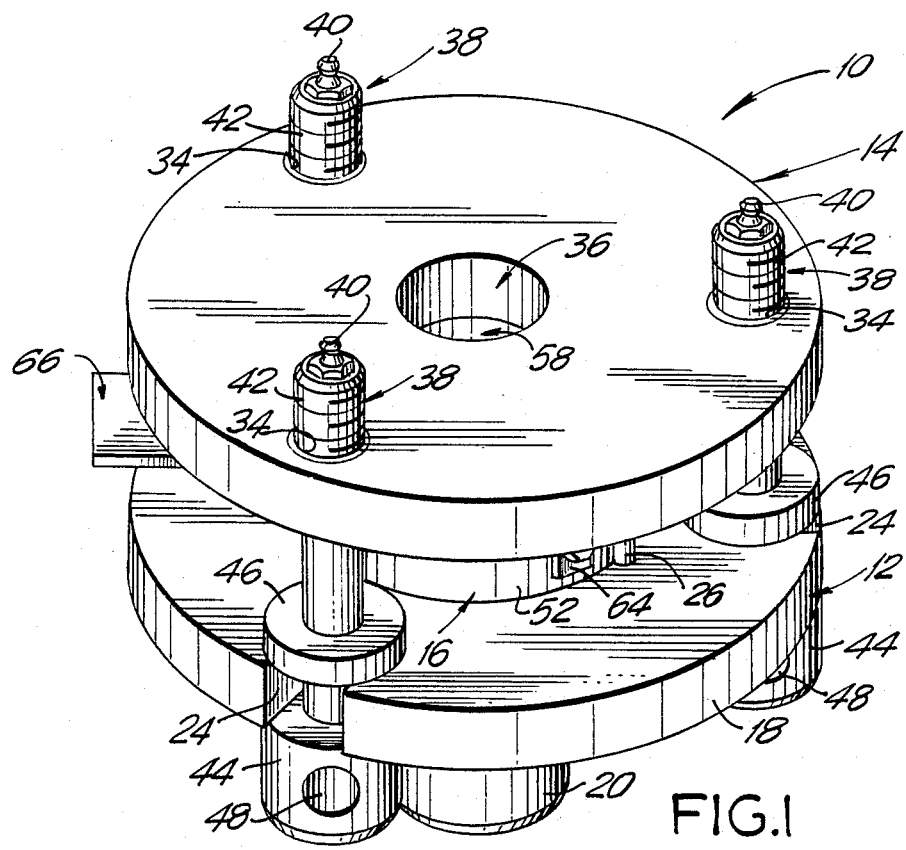
FIG. 1 is a perspective view of the quick-release assembly for a rupture disc insert type holder and the like in accordance with the present invention.
Figure 3:
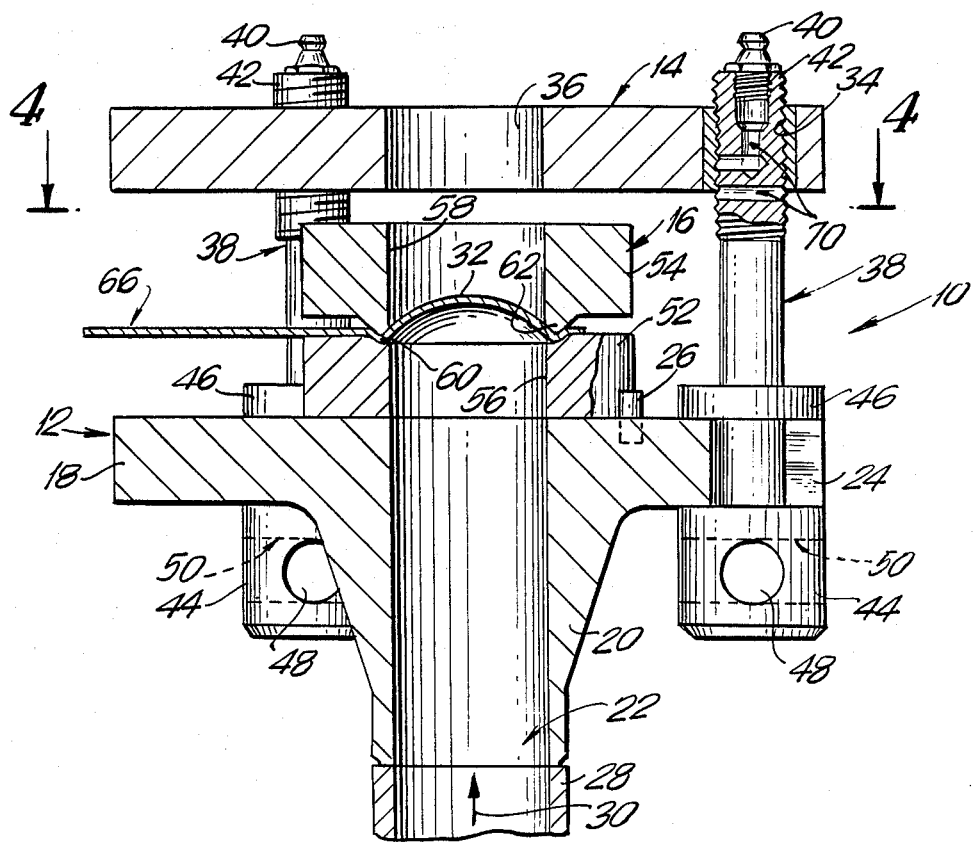
FIG. 3 is a cross sectional elevational view showing the rupture disc insert type holder inserted into the quick-release assembly prior to being secured therein.
Figure 2:
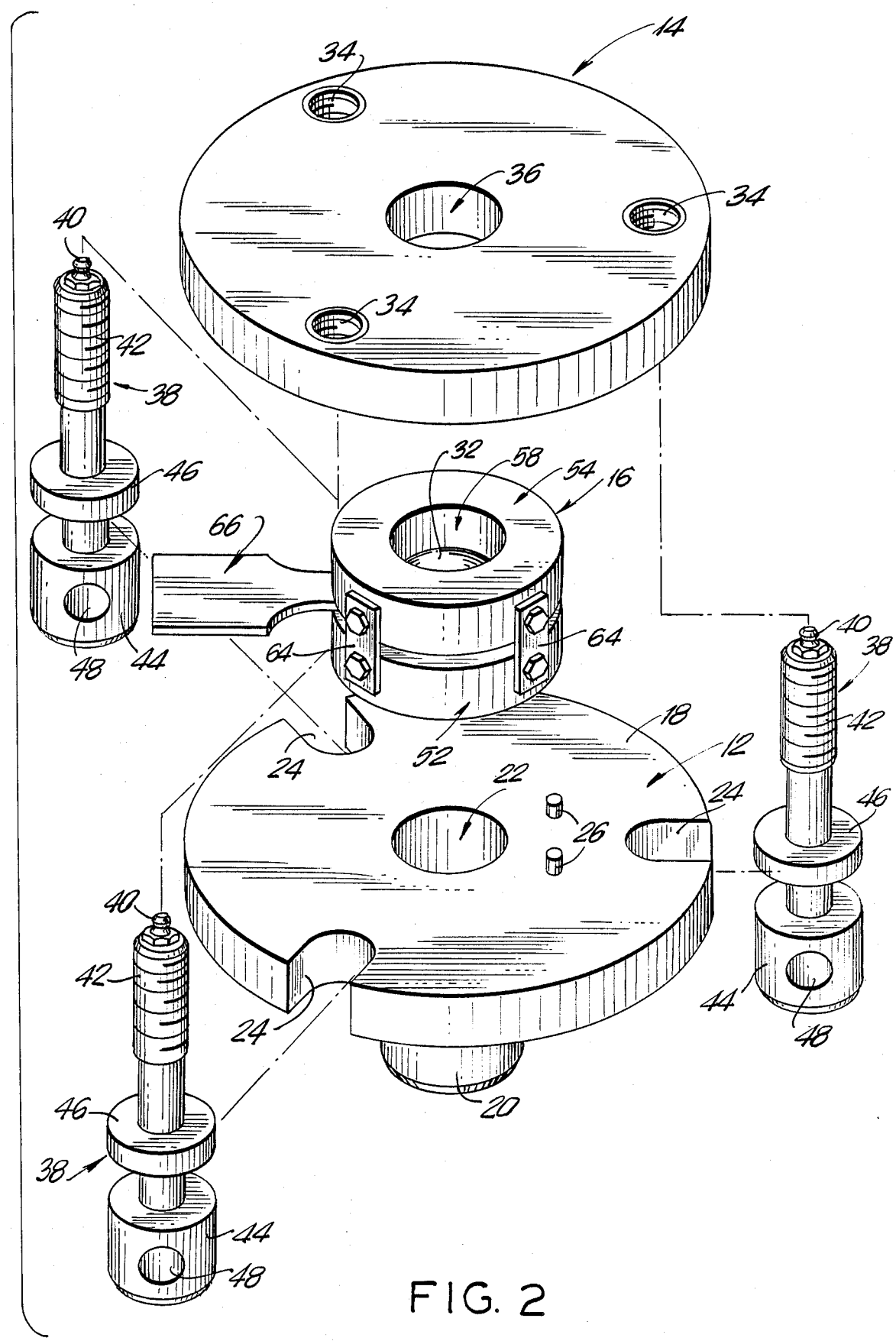
FIG. 2 is an exploded perspective view of the quick-release assembly of FIG. 1.

Referring now to the drawings, FIGS. 1 and 2 disclose a quick-release assembly 10 according to the present invention. The quick-release assembly 10 includes a pair of flanges, a lower flange 12 and an upper flange 14, for receiving a rupture disc insert type holder 16 therebetween in a leak-tight seal, as set forth below. The lower flange 12 includes a circular upper plate portion 18 and a cylindrical lower portion 20 which tapers inwardly in a downward direction from the upper plate portion 18, as best shown in FIG. 3. The lower flange 12 has an axial opening 22 extending through the plate portion 18 and the cylindrical portion 20. The lower flange 12 has three spaced apart slots 24 provided in the periphery of the plate portion 18, the slots 24 being approximately 120° apart, the function thereof being discussed below.

Additionally, the lower flange 12 is provided with stop means to position the rupture disc insert type holder 16 between the lower and upper flanges 12, 14. The stop means includes a pair of spaced apart pins 26 extending upwardly from the top surface of the plate portion 18 for engagement with the rupture disc insert type holder 16 when positioned between the lower and upper flanges 12, 14. Preferably, the pins 26 are disposed between the opening 22 and one of the slots 24 in such a manner that the pins 26 lie on opposite sides of a plane passing through the opening 22 and the associated slot 24.

As shown in FIG. 3, the lower end portion of the cylindrical portion 20 of the lower flange 12 is secured, preferably by welding, to a pressure relief conduit, pipe or vent 28 of a pressure system, equipment or vessel, not shown. Accordingly, fluid under pressure flows from the conduit, pipe or vent 28 into the opening 22 of the lower flange 12 as indicated by the arrow 30. The fluid under pressure is forced against the thin metal diaphragm of the rupture disc 32 contained within the insert holder 16, where the diaphragm of the rupture disc 32 will only rupture at a predetermined pressure and temperature in a conventional manner well known in the art in order to safeguard the system.

The upper flange 14 has a circular plate configuration. Three spaced apart threaded openings 34 are provided near the periphery of the upper plate 14. The threaded openings 34 of the upper flange 14 are preferably 120° apart so that the threaded openings 34 are in alignment with associate ones of the slots 24 of the lower flange 12. A central opening 36 extends axially through the upper flange 14. The opening 36 of the upper flange 14 has the same diameter as the opening 22 of the lower flange 12, and is in axial alignment therewith.

Preferably, the lower and upper flanges 12, 14 are fabricated from forged steel, and are machined to match a standard bore pipe. Obviously, the flanges 12, 14 can be machined to match other bores.

The quick-release assembly 10 also includes a minimum number of bolts, preferably three Jack-type bolts 38, to secure the two flanges 12, 14 together, and also to provide quick access to the rupture disc insert holder 16 disposed between the flanges 12, 14 when it is desired to replace or inspect the rupture disc 32 contained within the insert holder 16. Each of the bolts 38 has a high tensile strength, being fabricated from steel and being zinc plated for corrosion resistance. Accordingly, the bolts 38 can be fabricated from stainless steel to insure against corrosion and binding, and to provide additional strength.

Each bolt 38 includes a grease fitting 40 in the free end thereof, where the free end portion 42 is threaded, the threaded end portion 42 having a length approximately twice the thickness of the upper flange 14. An enlarged head 44 is disposed at the opposite end of the bolt 38. A collar 46 is disposed along the bolt 38, being spaced from the head 44, a distance equal approximately to the thickness of the plate portion 18 of the lower flange 12, the function of which is set forth below. The diameter of the collar 46 is equal to the diameter of the head 44, where these diameters of the collar 46 and head 44 are larger than the transverse dimension of the slots 24 in the flange 12. Additionally, the head 44 has a first opening 48 therethrough, and a second opening 50 therethrough, being spaced 90° from the first opening 48 so that the openings 48, 50 intersect each other, the function of which is also set forth below.

The rupture disc insert type holder 16 includes a circular lower base flange or plate 52, which is disposed on the inlet side, and a circular upper holddown flange or plate 54, which is disposed on the outlet side. The base and holddown flanges or plates 52, 54 have axial openings 56, 58 therethrough, respectively, corresponding in size to the openings 22, 36 of the lower and upper flanges 12, 14. As best shown in FIG. 3, the inner surfaces 60, 62 of the base and holddown flanges or plates 52, 54 are inclined in order to grip the rupture disc 32 therebetween in a sandwich arrangement to form a leak-tight seal, where the diaphragm of the rupture disc 32 extends across the openings 56, 58 of the base and holddown flanges or plates 52, 54. Preferably, spaced apart plate and bolt means 64 secure the base and holddown flanges or plates 52, 54 together, in a manner well known in the art. Furthermore, an identification tag 66 forms part of the rupture disc 32, where the identification tag 66 extends outwardly from between the base and holddown flanges or plates 52, 54, and also extends outwardly from between the lower and upper flanges 12, 14 as best shown in FIG. 1.

To install the quick release assembly 10, the end of the cylindrical portion 20 of the lower flange 12 is secured by welding to the pressure relief conduit, pipe or vent 28 of the pressure system, equipment or vessel as shown in FIG. 3. The bolts 38 are now mounted on the plate portion 18 of the lower flange 12 by sliding the bolt 38 into the slots 24 so that the head 44 of each bolt 38 is disposed below the plate portion 18 and the collar 46 of each bolt 38 is disposed below the plate portion 18 and the collar 46 of each bolt 38 is disposed above the plate portion 18, as shown in FIG. 3. Accordingly, there is only a sliding clearance between the head 44 and collar 46 of each bolt 38 with respect to the plate portion 18, so that the bolts 38 remain mounted on the plate portion 18 of the lower flange 12. The upper flange 14 is now positioned above the lower flange 12, and the threaded end portion 42 of each bolt 38 is now threaded into an associated one of the threaded openings 34 in the upper flange 14, in such a manner as to leave a sufficient space between the upper flange 14 and the lower flange 12 as shown in FIG. 3.

Figure 4:
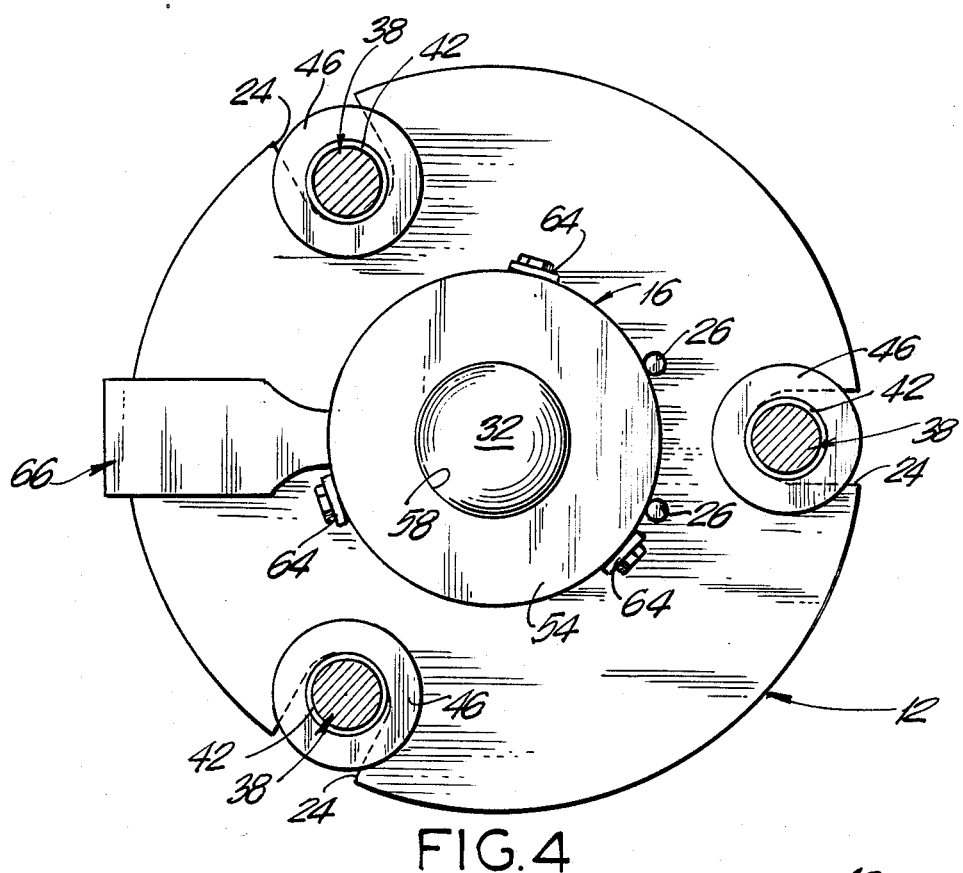
FIG. 4 is a cross sectional view taken along line 4—4 of FIG. 3.

The rupture disc insert type holder 16 is now inserted between the upper flange 14 and lower flange 12 until the insert type holder 16 engages the stop pins 26, as shown in FIGS. 3 and 4. The heads 44 of the bolts 38 are now rotated, preferably by a tool, not shown, inserted into either of the head openings 48, 50 to facilitate turning thereof, so that the threading action between the threaded end portion 42 of the bolts 38 and threaded openings 34 of the upper flange 14 causes the upper flange 14 to be lowered onto the insert type holder 16 in a leak-tight seal therebetween as shown in FIG. 5.

Figure 5:
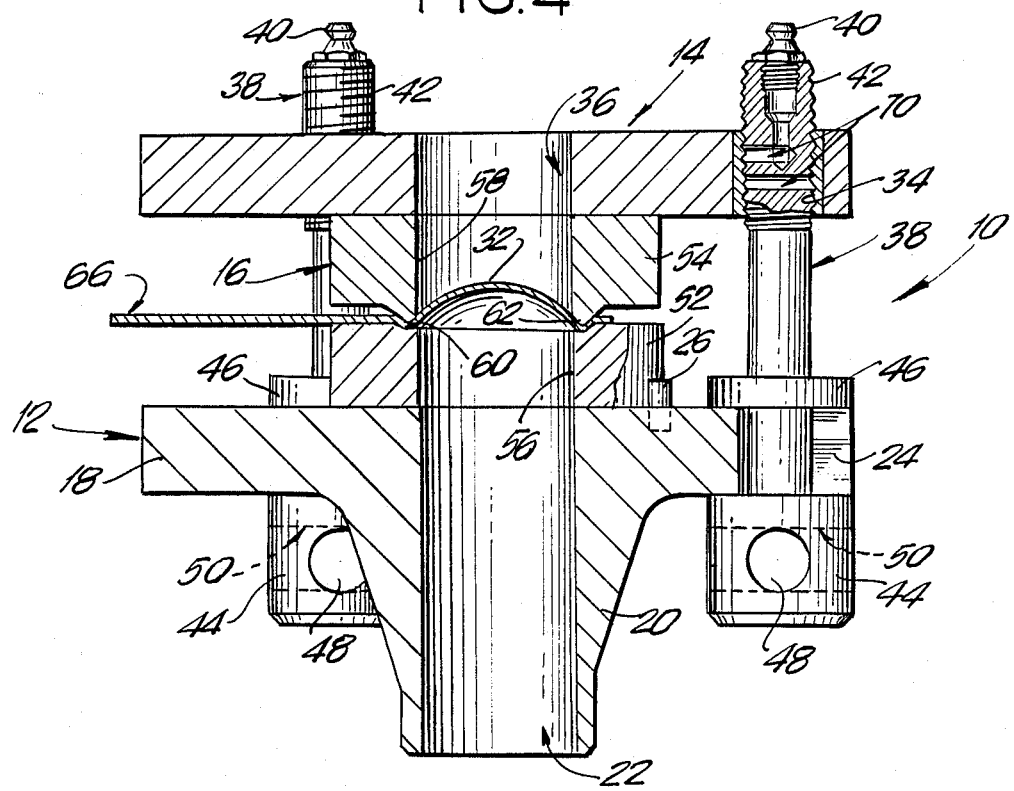
FIG. 5 is a cross sectional elevational view similar to FIG. 3 showing the rupture disc insert type holder secured within the quick-release assembly.

As shown in FIGS. 3 and 5, the grease fitting 40 of each bolt 38 communicates with suitable openings 70 in and around the threaded end portion 42 of each bolt 38 so that the grease from the fitting 40 can flow onto the threads of the openings 34 of the upper flange 14. Thus, the grease prevents the threaded end portion 42 from binding or corroding in the threaded opening 34 of the upper flange 14.

As clearly shown in FIG. 5, the opening 22 in the lower flange 12, the opening 56 in the base flange or plate 52, the opening 58 in the holddown flange or plate 54 and the opening 36 in the upper flange 14 are in axial alignment with each other, with the diaphragm of the rupture disc 32 extending across the openings to prevent communication therethrough until when the rupture disc 32 is caused to be ruptured at a predetermined pressure and temperature to safeguard the system in a convention manner well known in the art.

Accordingly, when it is desired to have quick access to the rupture disc insert holder 16 in order to replace or inspect the rupture disc 32, the above mentioned tool is inserted into either of the openings 48, 50 of the head 44 of each of the bolts 38 to rotate the bolts 38 in the opposite direction from that mentioned above. Thus, the turning of the bolts 38 causes the threaded end portion 42 of each bolt to unthread from its associated threaded opening 34 in the upper flange 14 to force or spread the upper flange 14 apart from the lower flange 12, and also from the insert type holder 16. The quick-release assembly 10 shown in the seal-tight position of FIG. 5 is now spread apart to the open position shown in FIG. 3 to enable the rupture disc insert holder 16 to be removed from between the flanges 12, 14.

Figure 6:
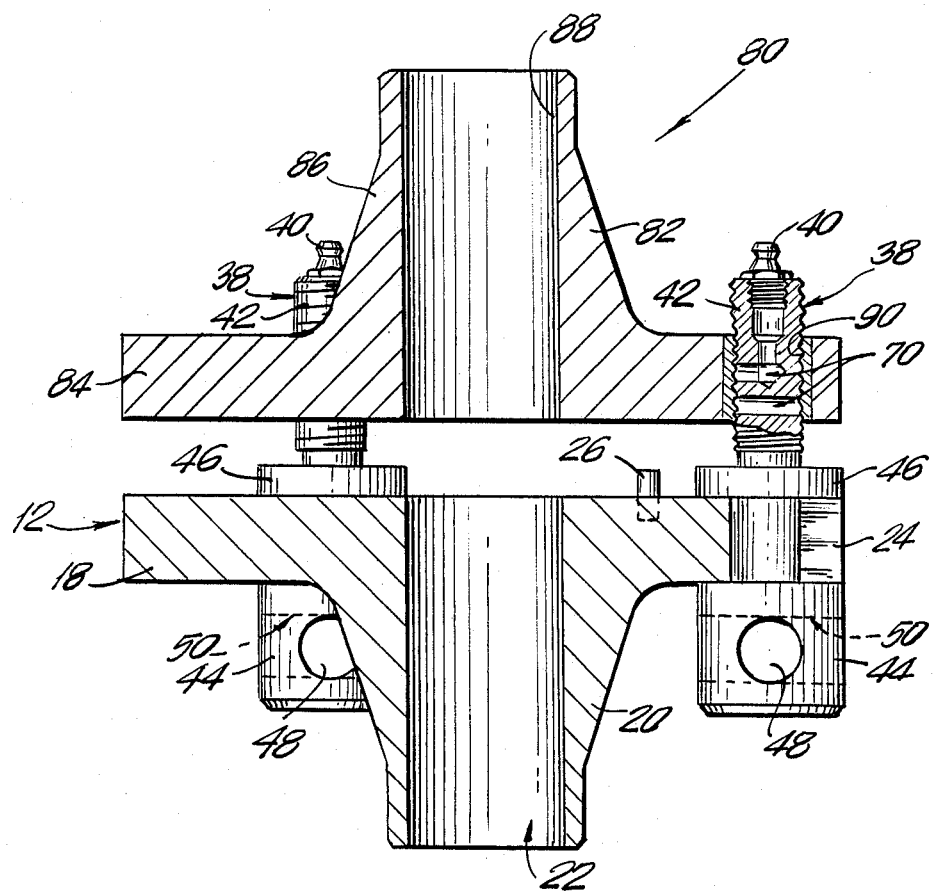
FIG. 6 shows a cross sectional elevational view of a modified quick-release assembly in accordance with the present invention.

FIG. 6 shows a modified quick-release assembly 80, where the modification is only made to the upper flange 82, the lower flange 12 and the bolts 38 remaining the same as set forth above.

The upper flange 82 includes a circular lower plate portion 84 and a cylindrical upper portion 86 which tapers inwardly in an upward direction from the lower plate portion 84. The upper flange 82 has an axial opening 88 extending through the plate portion 84 and the cylindrical portion 86. Here again, the upper flange 82 has three spaced apart threaded openings 90 provided in the peripherial portion of the plate portion 84, similar to the above mentioned threaded openings 34 in the upper flange 14. The threaded openings 90 are accordingly spaced approximately 120° apart for cooperation with the slots 24 in the lower flange 12, in the same manner as set forth above. Accordingly, a conduit or a pipe, not shown, can be welded to the upper end of the cylindrical portion 86 for communication therewith, as is well known in the art. The modified quick-release assembly 80 functions in the same manner as the quick-release assembly 10.

Figure 7:
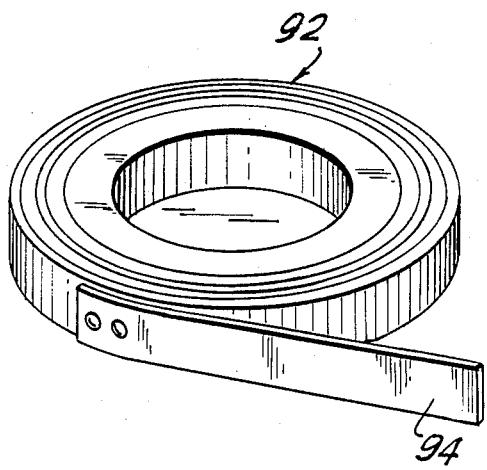
FIG. 7 shows a perspective view of a graphite rupture disc.

FIG. 7 discloses a commercially available graphite rupture disc 92 which is well known in the art. The graphite rupture disc 92 is provided with a conventional identification tag 94. Accordingly, the graphite rupture disc 92 can be used in either of the above mentioned quick-release assemblies 10, 80 in place of the rupture disc insert type holder 16.

Figure 8:
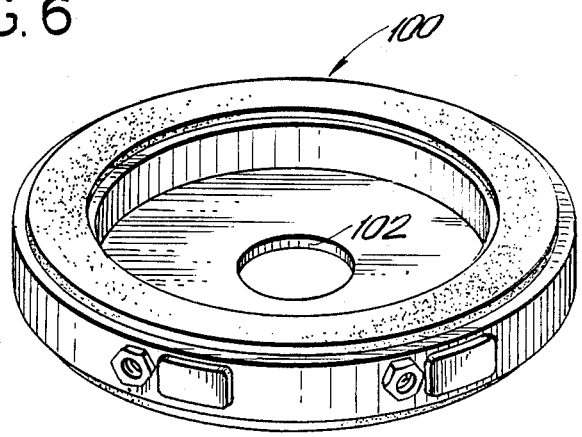
FIG. 8 shows a perspective view of an orifice plate.

FIG. 8 shows an orifice plate 100, which is commercially available and well known in the art. The orifice plate 100 has a small opening 102 therethrough for flow metering, as is well known in the art. Accordingly, here again, the orifice plate 100 can replace the above mentioned rupture disc insert type holder 16 for installation in either of the quick-release assemblies 10 and 80.

Numerous changes in the structures hereinabove discussed may suggest themselves to those skilled in the art, however, it is understood that the present disclosure relates to preferred embodiment of the invention, and is not to be construed as a limitation of the invention.

What is claimed is:

1. A quick release assembly for a rupture disc insert type holder and the like, comprising:
   a pair of first and second flanges for receiving a rupture disc insert type holder and the like therebetween in a leak-tight seal;
   first means for securing at least said first flange to a pressure relief conduit of a pressure system in flow communication therewith;
   second means for both securing said first and second flanges together and for spreading said first and second flanges apart to provide quick access to the rupture disc insert holder and the like disposed between said flanges for inspection and replacement of a rupture disc contained within the insert type holder and the like;
   said second means including at least two bolts;
   said second flange having threaded openings to securely receive threaded portions of said bolts;
   each of said bolts having an enlarged head for engaging an outer surface of said first flange;
   said first flange having slots in its periphery to receive said bolts;
   each of said bolts being provided with a collar spaced a predetermined distance from said englarged head so that said first flange is disposed between said collar and said enlarged head; and said collar engaging an inner surface of said first flange to mount said bolts on said first flange, and to force said second flange to move away from said first flange when said bolts are rotated to spread said first and second flanges apart.

2. A quick release assembly according to claim 1, wherein said bolts are Jack-type bolts.

3. A quick release assembly according to claim 1, wherein said second means includes a maximum of three bolts.

4. A quick release assembly according to claim 1, wherein each of said threaded portions of said bolts is provided with grease fitting means at a free end thereof so that grease can flow into said threaded openings of said second flange to prevent binding and and corroding between said bolts and said second flange.

5. A quick release assembly according to claim 1, wherein said first flange is provided with stop means to position the insert type holder and the like between said first and second flanges.

6. A quick release assembly according to claim 5, wherein said stop means include a pair of pins extending outwardly from an inner surface of said first flange.

7. A quick release assembly according to claim 1, wherein said enlarged head of each of said bolts includes open means for receiving a tool to rotate each of said bolts.

8. A quick release assembly according to claim 1, including a rupture disc insert type holder disposed between said first and second flanges.

9. A quick release assembly according to claim 1, including a graphite rupture disc disposed between said first and second flanges.

10. A quick release assembly according to claim 1, including an orifice plate disposed between said first and second flanges.

* * * * *